US012782214B2

(12) United States Patent
Kawasaki et al.

(10) Patent No.: US 12,782,214 B2
(45) Date of Patent: Nov. 3, 2026

(54) CONTACT SENSOR MODULE

(71) Applicant: THK CO., LTD., Tokyo (JP)

(72) Inventors: Jun Kawasaki, Tokyo (JP); Masaki Shibuya, Tokyo (JP); Norimasa Okada, Tokyo (JP)

(73) Assignee: THK CO., LTD., Tokyo (JP)

( * ) Notice: Subject to any disclaimer, the term of this patent is extended or adjusted under 35 U.S.C. 154(b) by 192 days.

(21) Appl. No.: 18/697,066

(22) PCT Filed: Sep. 22, 2022

(86) PCT No.: PCT/JP2022/035330
§ 371 (c)(1),
(2) Date: Mar. 29, 2024

(87) PCT Pub. No.: WO2023/054155
PCT Pub. Date: Apr. 6, 2023

(65) Prior Publication Data

US 2024/0402025 A1 Dec. 5, 2024

(30) Foreign Application Priority Data

Oct. 1, 2021 (JP) ................................ 2021-162952

(51) Int. Cl.
*G01L 5/16* (2020.01)
*B64U 20/83* (2023.01)

(52) U.S. Cl.
CPC ................ *G01L 5/16* (2013.01); *B64U 20/83* (2023.01)

(58) Field of Classification Search
CPC .......... G01L 5/16; G01L 1/205; G01L 5/161; B64U 20/83
See application file for complete search history.

(56) References Cited

U.S. PATENT DOCUMENTS 12,336,955 B2 * 6/2025 AlGhazi ............. A61H 9/0092
2004/0093953 A1 * 5/2004 Gilkison ................ G01P 5/165
73/736

(Continued)

FOREIGN PATENT DOCUMENTS

CN 207790921 U 8/2018
JP 2021-004846 A 1/2021

OTHER PUBLICATIONS

International Search Report dated Oct. 25, 2022, issued in counterpart International Application No. PCT/JP2022/035330. (2 pages).

(Continued)

*Primary Examiner* — Tarun Sinha
(74) *Attorney, Agent, or Firm* — WHDA, LLP

(57) ABSTRACT

A contact sensor module includes a base unit with columnar shape, a plurality of pressure-sensitive sensors mounted on a tip end of the base unit, a flexible cover attached to the base unit so as to cover the tip end of the base unit, and a hard intermediate member disposed between the tip end of the base unit and the cover. The pressure-sensitive sensors are mounted on a surface of the base unit in a state inclined so as to approach a center axis of the base unit along a first direction from a base end side to a tip end side of the base unit. The intermediate member is formed such that an outer wall surface of the intermediate member is in close contact with an inner wall surface of the cover.

9 Claims, 18 Drawing Sheets

(56) References Cited

U.S. PATENT DOCUMENTS

| | | | | |
|---|---|---|---|---|
| 2013/0144437 | A1* | 6/2013 | Lee | G01L 5/1623 700/258 |
| 2020/0300598 | A1* | 9/2020 | Kim | G01L 5/0052 |

OTHER PUBLICATIONS

Office Action dated Aug. 21, 2026, issued in counterpart CN Application No. 202280065909.8, with English translation. (13 pages).

* cited by examiner

[Fig. 1]
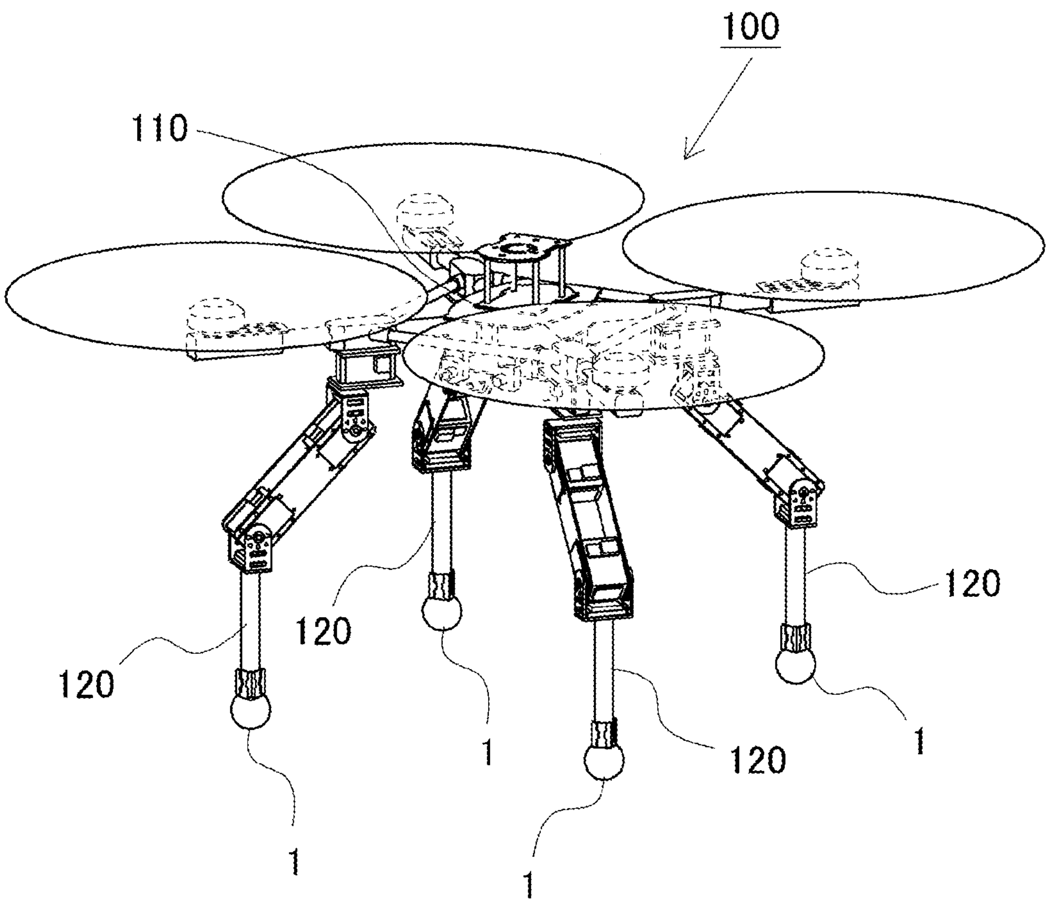

[Fig. 2]
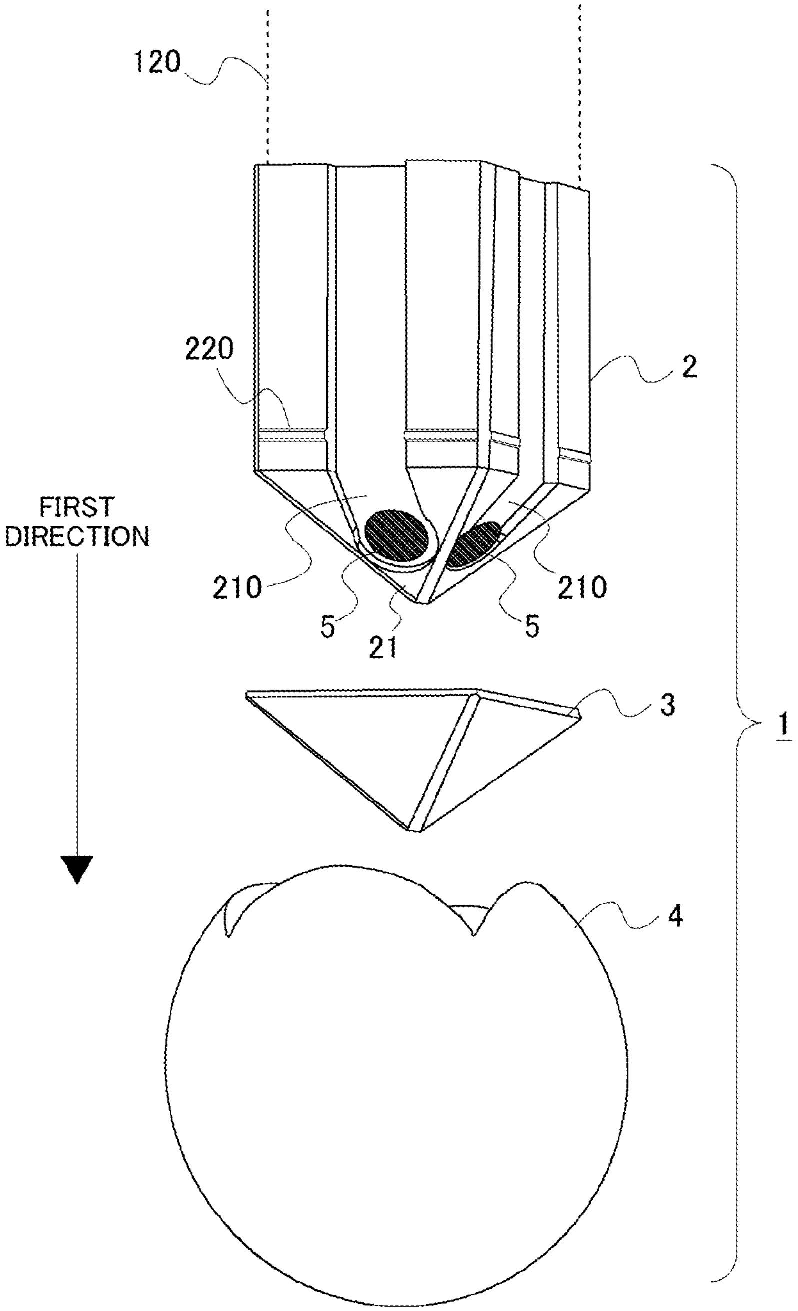

[Fig. 3]
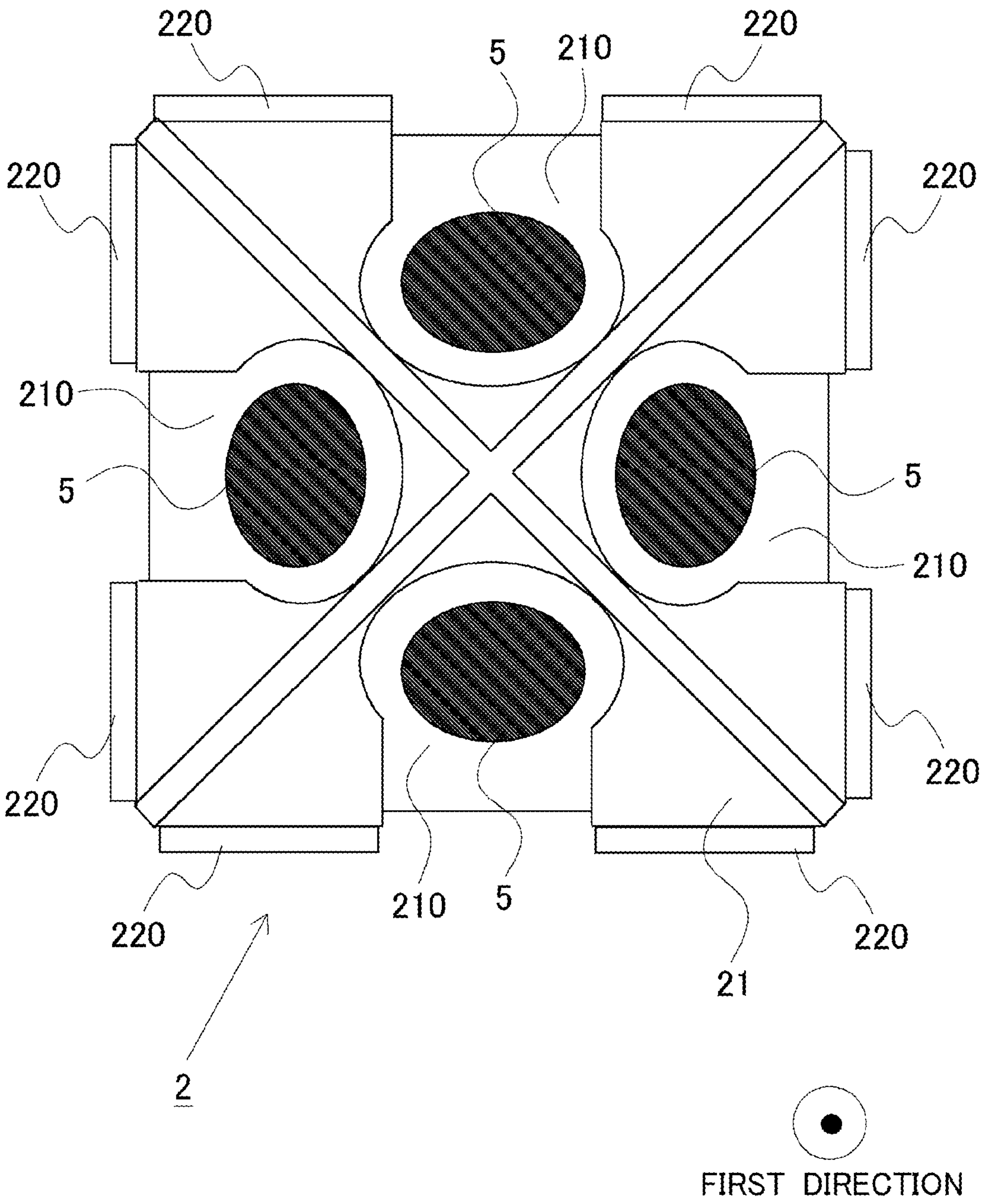

[Fig. 4]
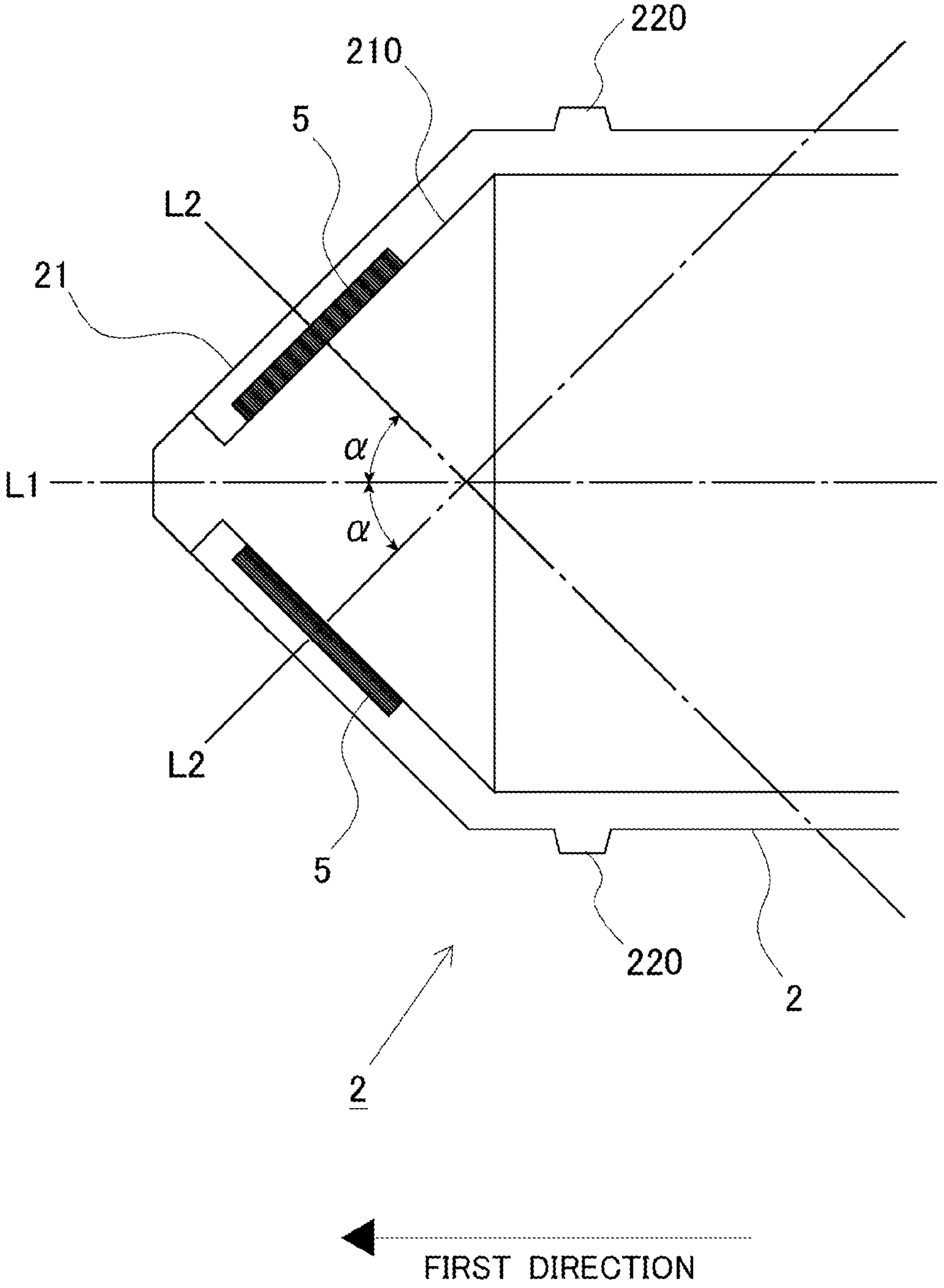

[Fig. 5]
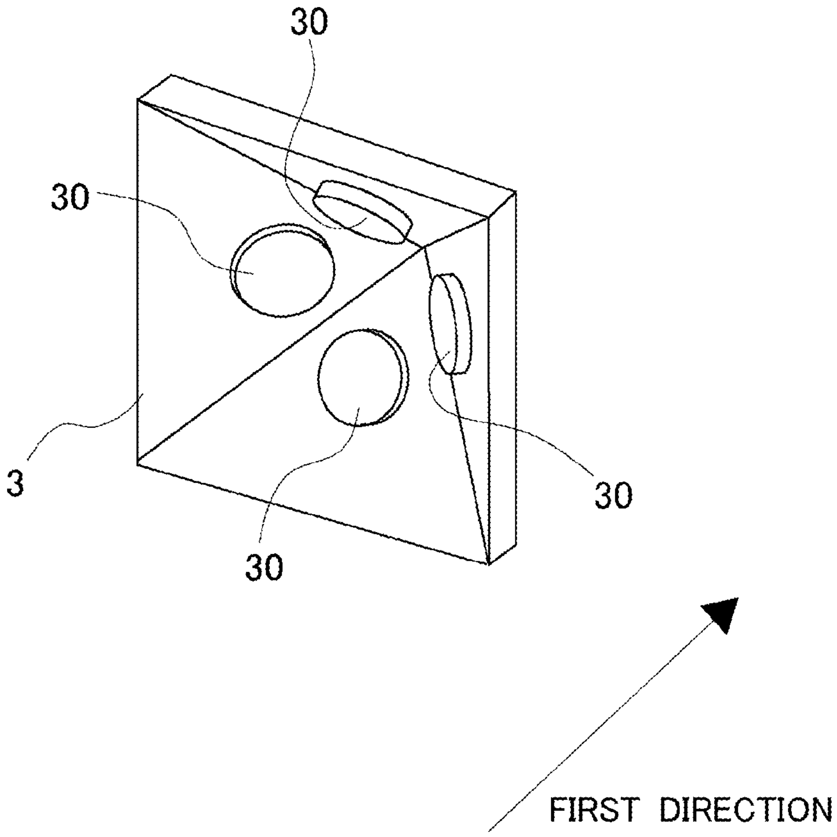

[Fig. 6]
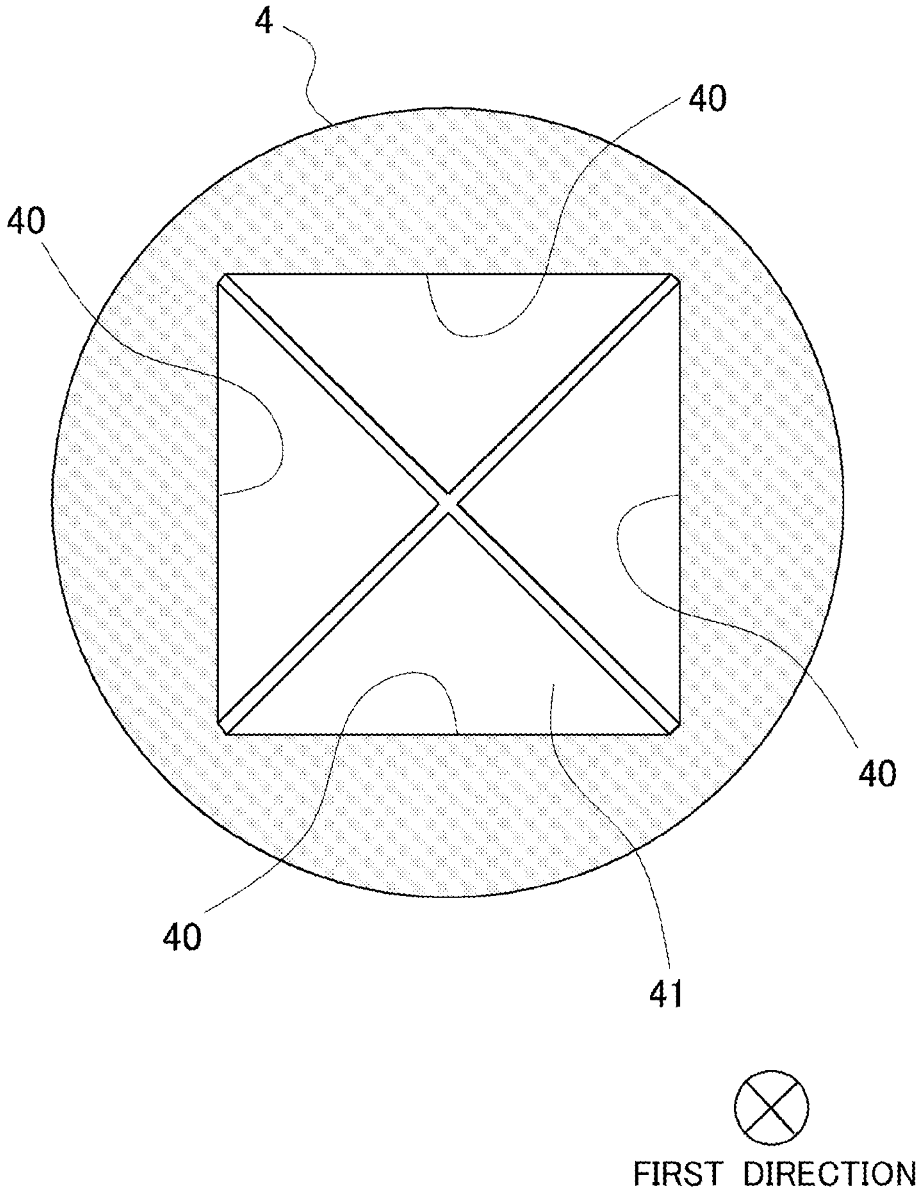

[Fig. 7]
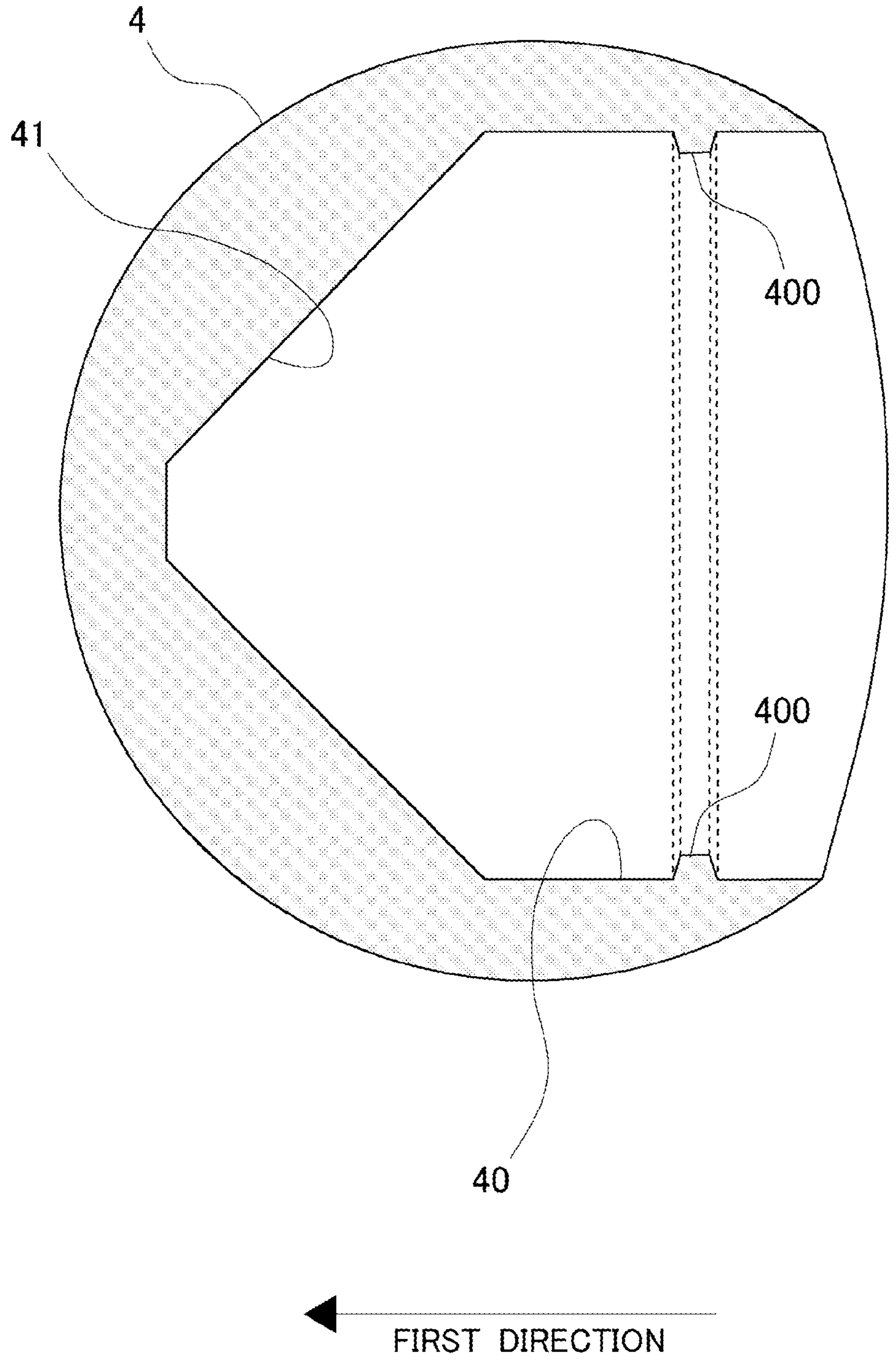

[Fig. 8]
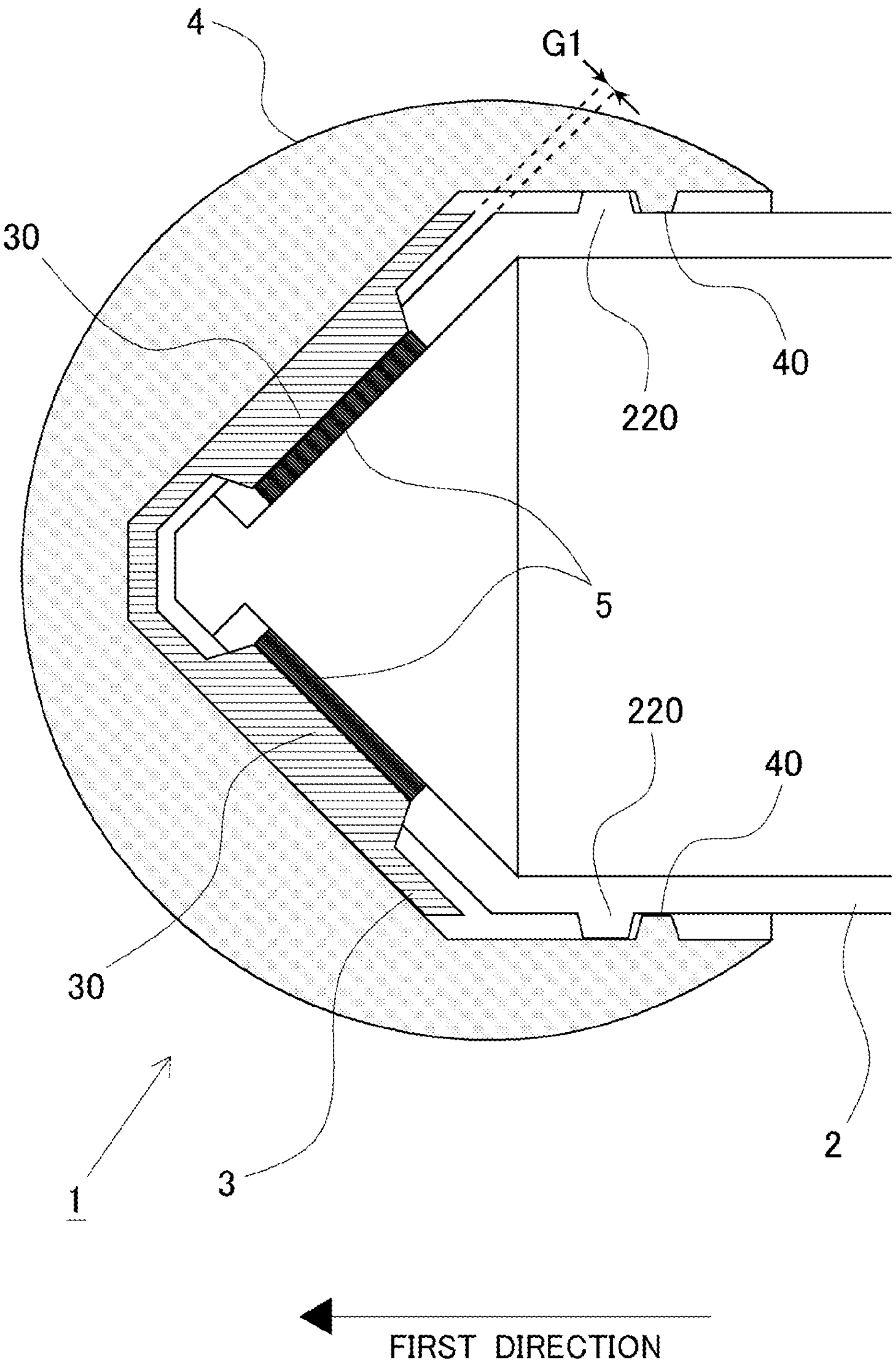

[Fig. 9]
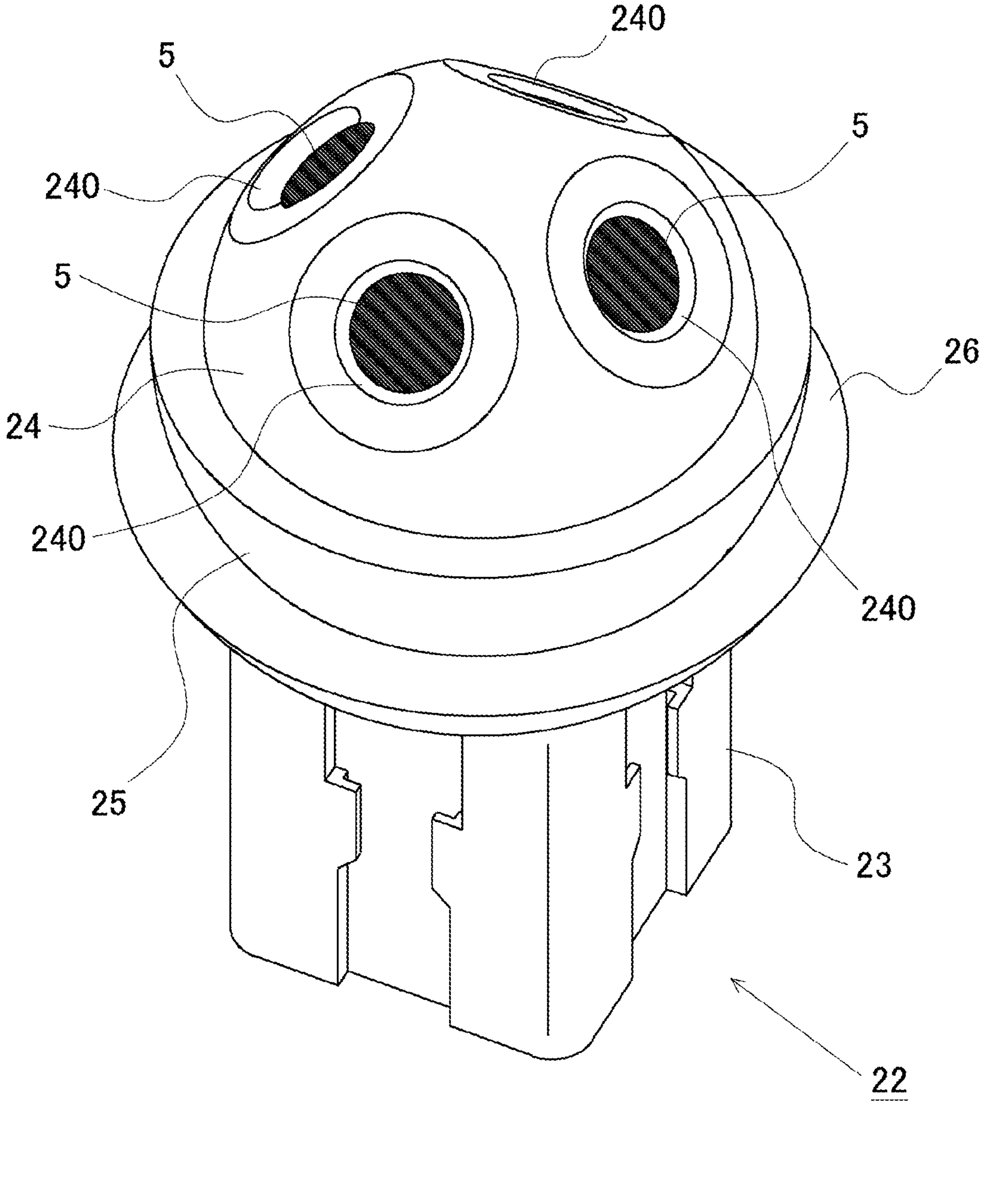

[Fig. 10]
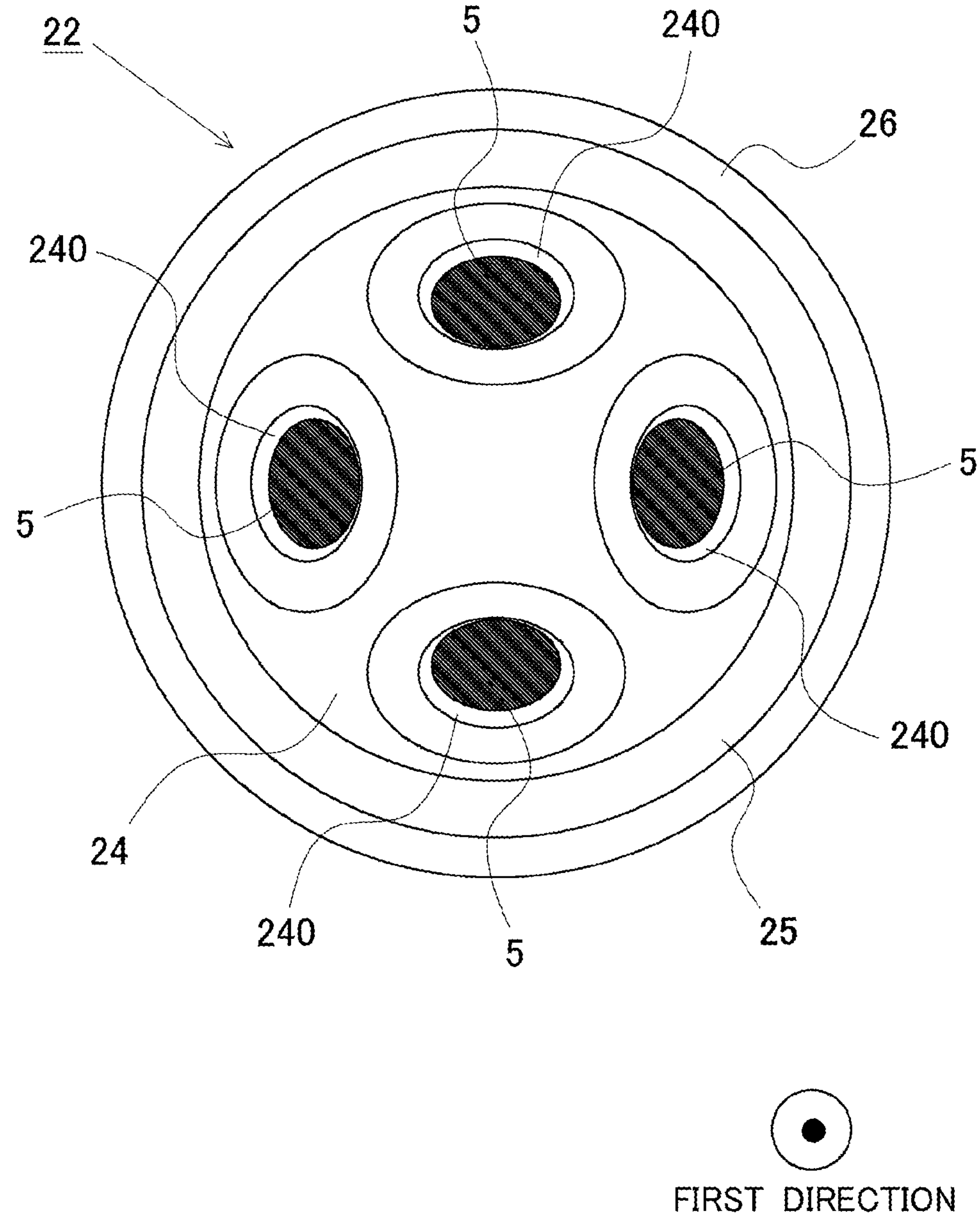

[Fig. 11]
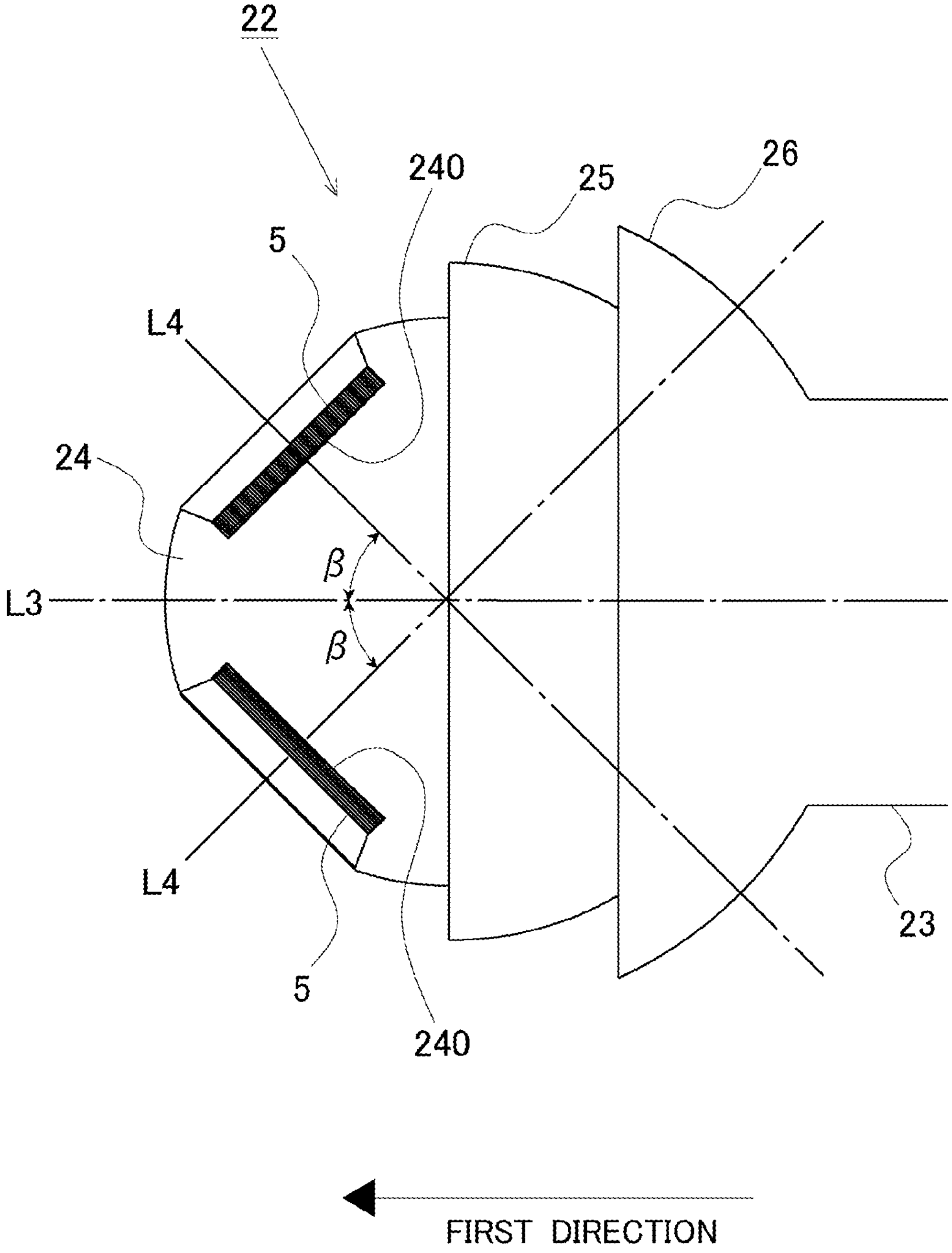

[Fig. 12]
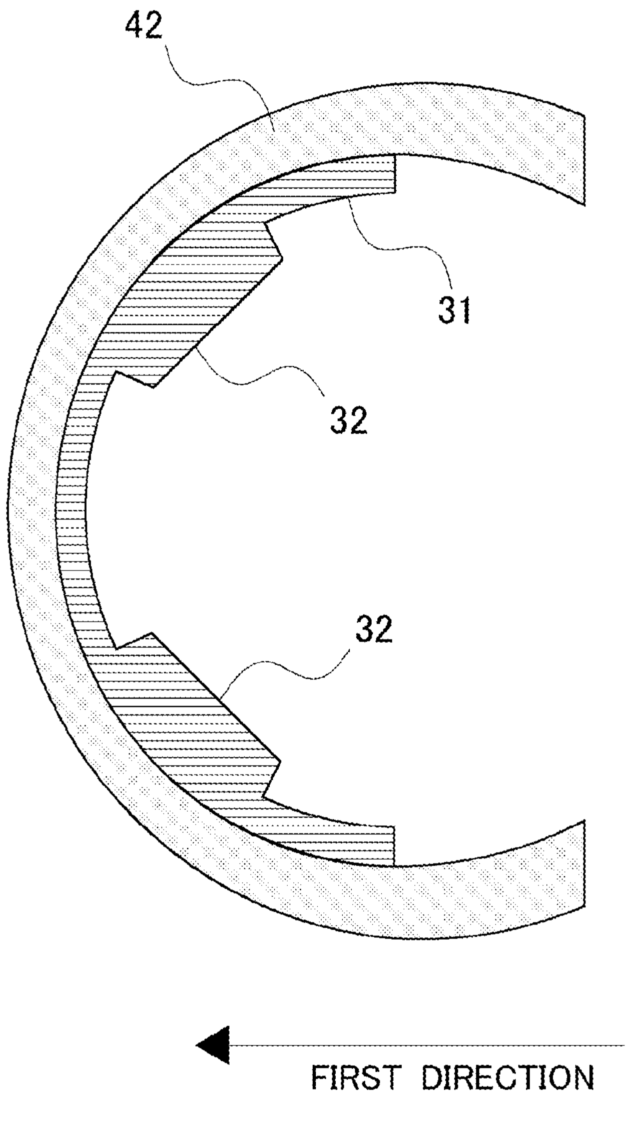

[Fig. 13]
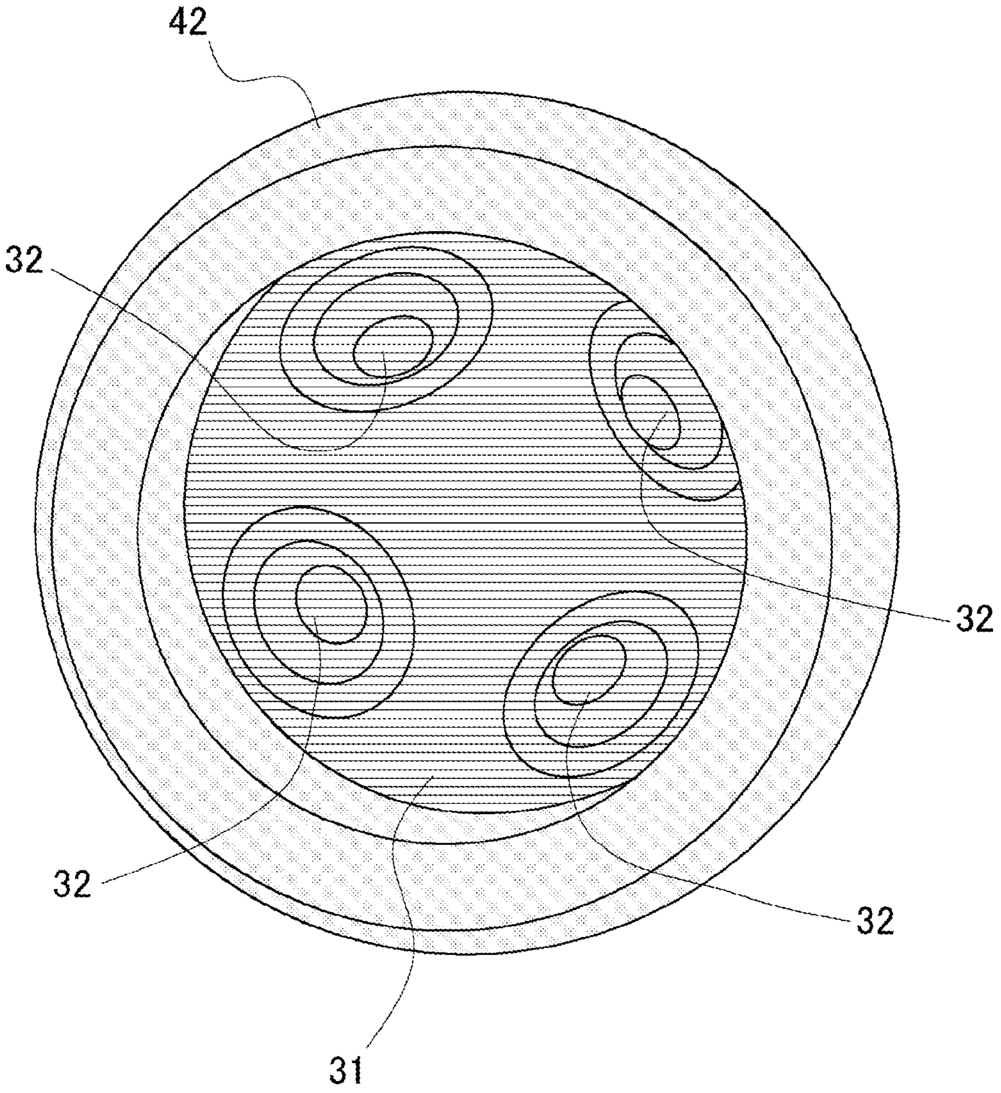

[Fig. 14]
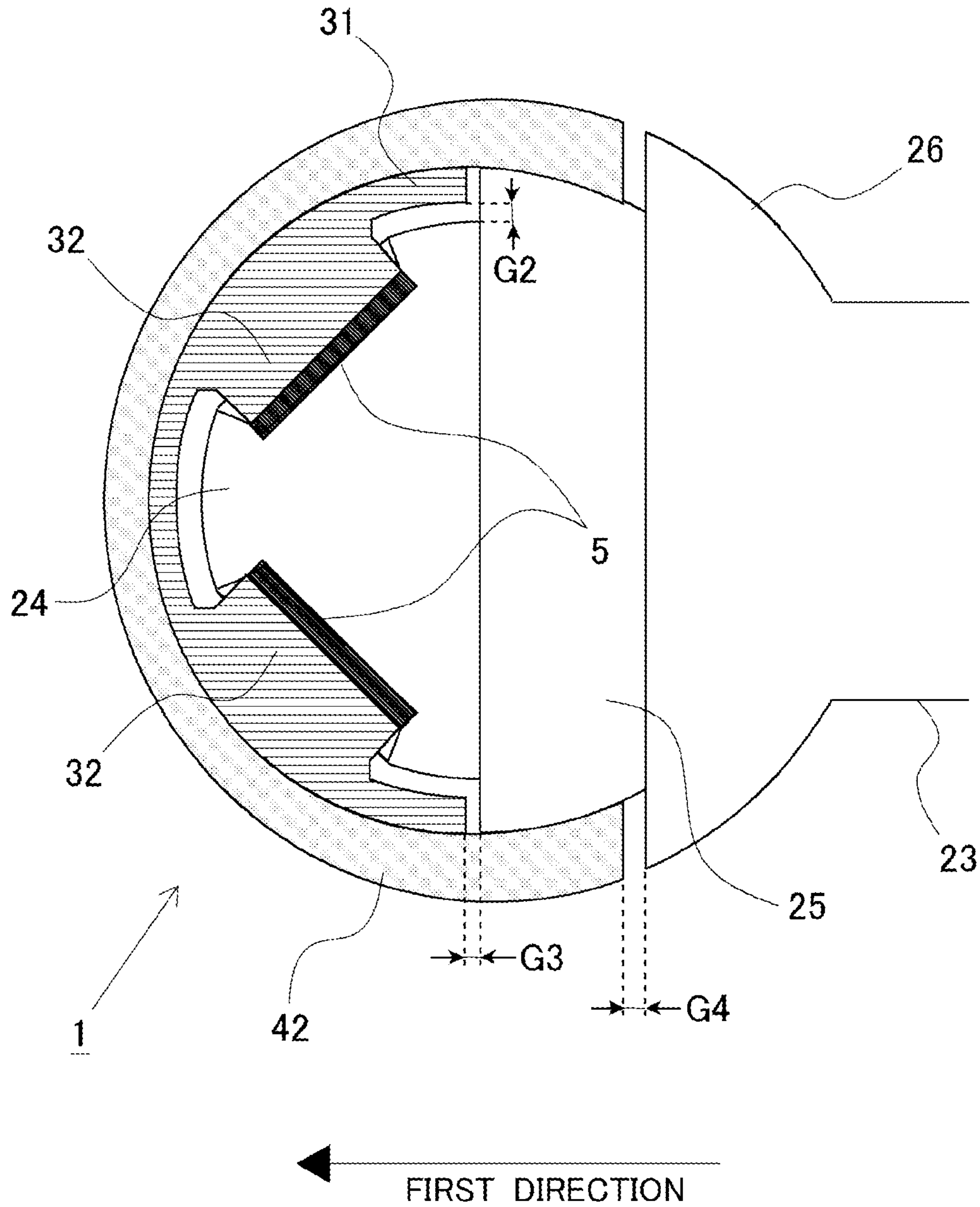

[Fig. 15]
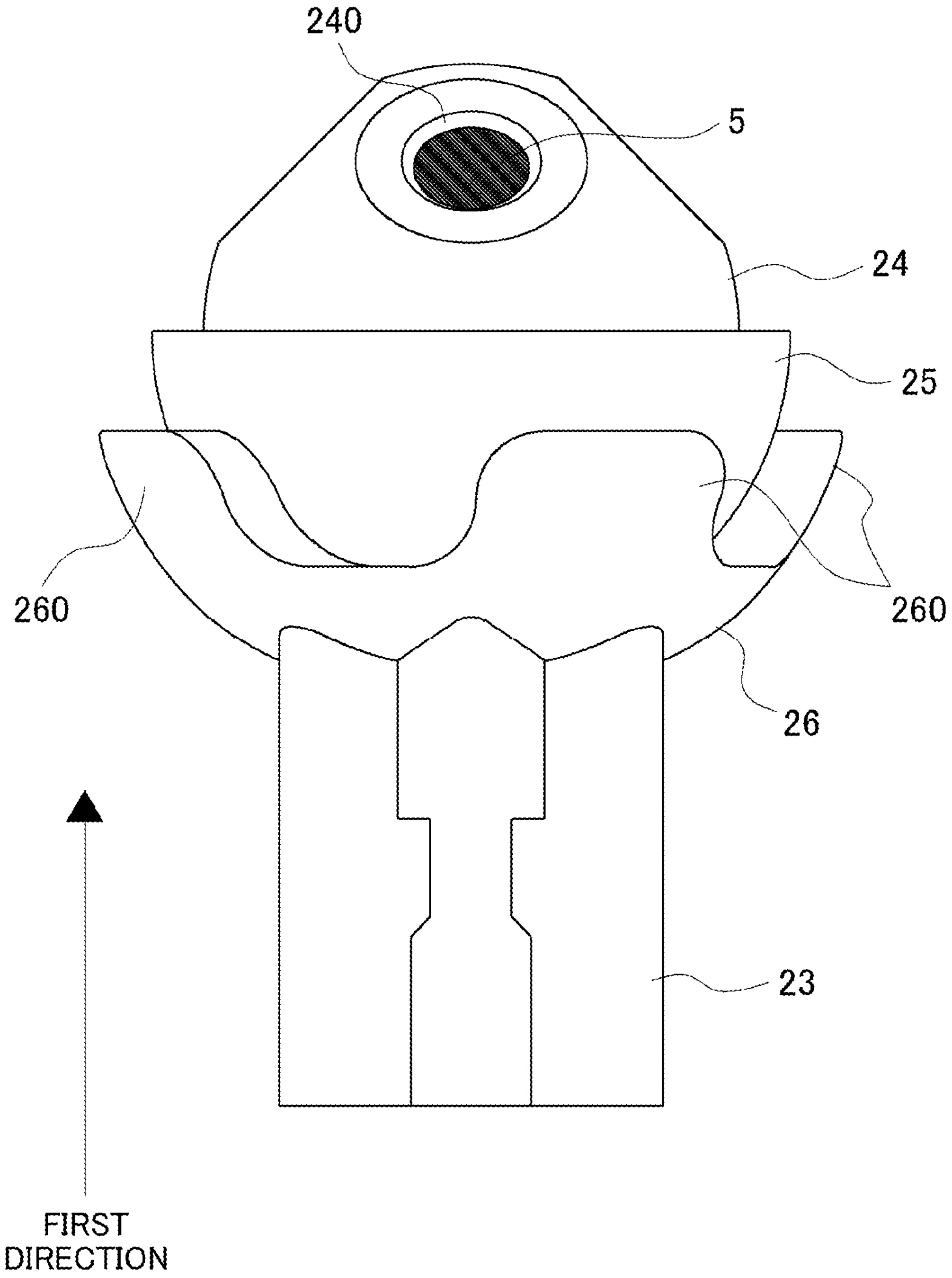

[Fig. 16]
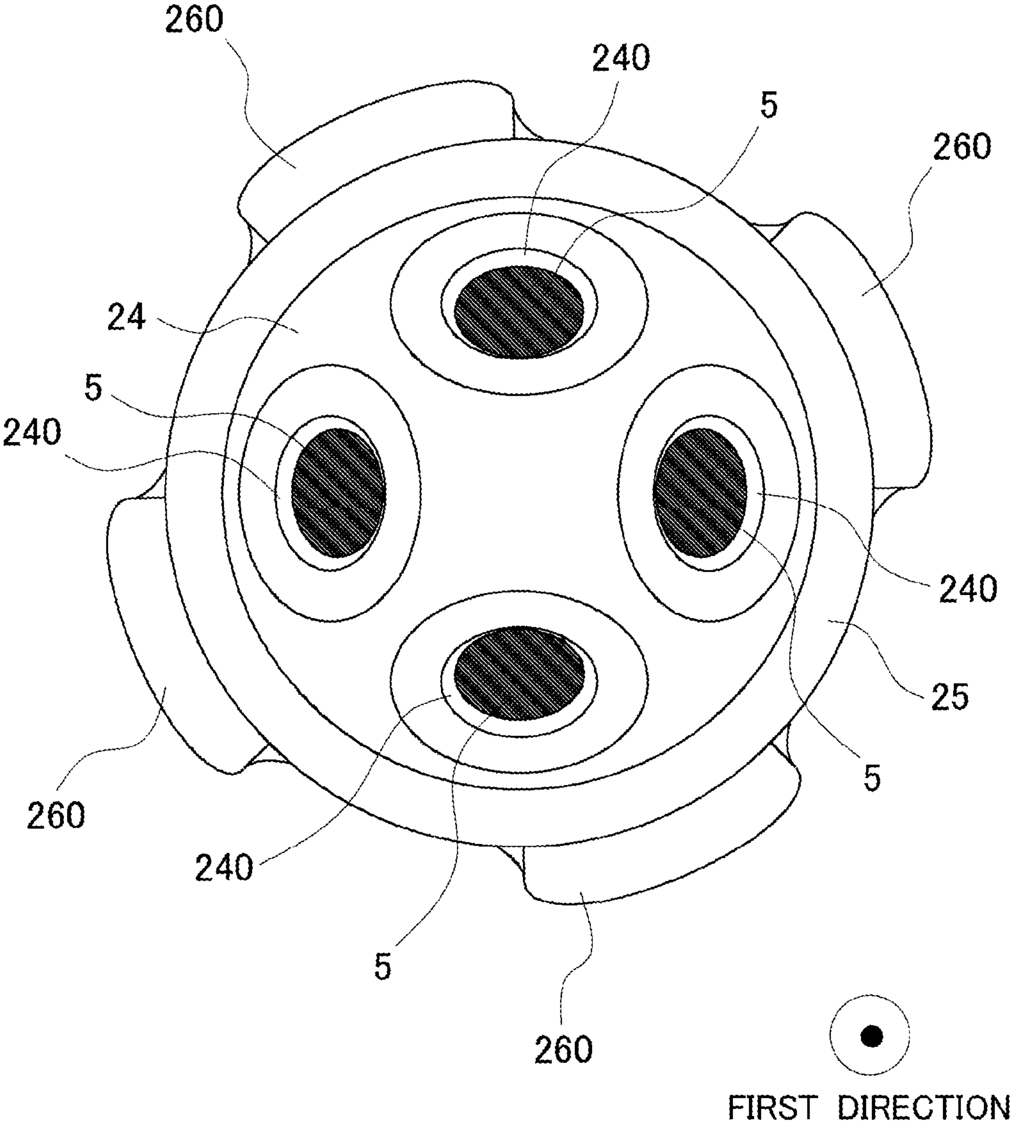

[Fig. 17]
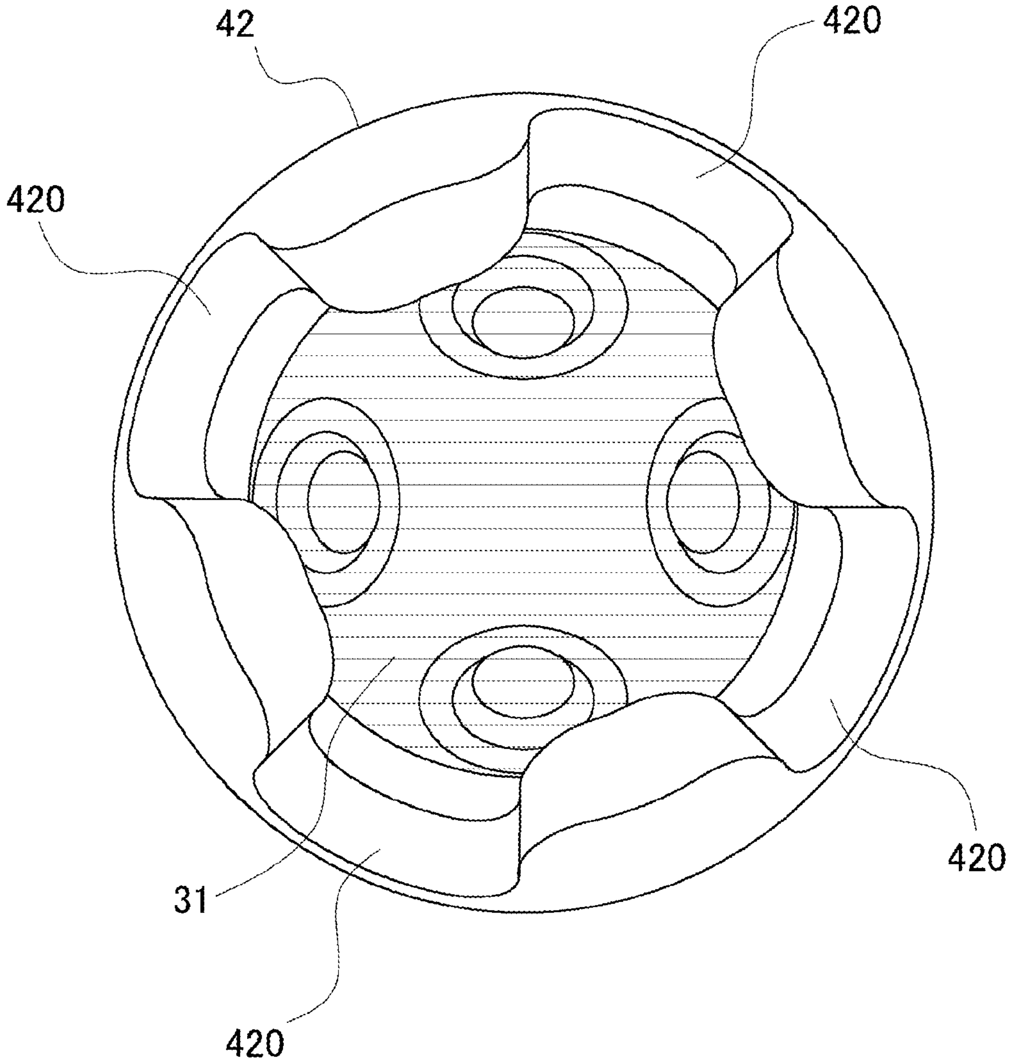

[Fig. 18]
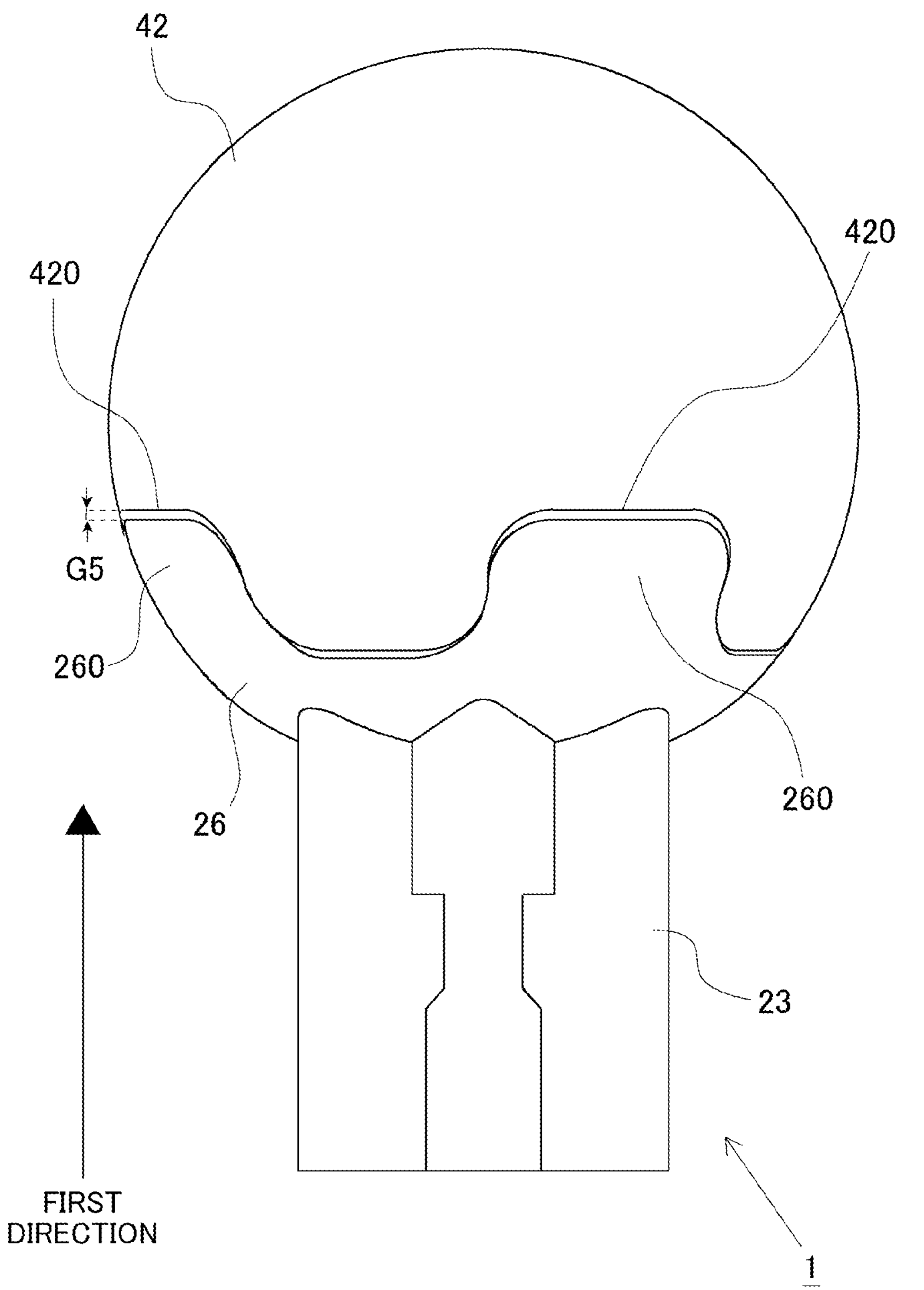

CONTACT SENSOR MODULE

TECHNICAL FIELD

The present invention relates to a contact sensor module.

BACKGROUND ART

As a device for detecting contact with an object, there has been known a device using a force sensor capable of detecting loads in multiaxial directions (see, for example, Patent Literature 1).

CITATION LIST

Patent Document

Patent document 1: Japanese Patent Laid-Open No. 2021-004846

SUMMARY OF THE INVENTION

Technical Problem

In recent years, development of flying robots such as drones has been advanced. Also, the development of flying robots capable of walking on land has been advanced. These flying robots are expected to be used in areas where humans cannot enter, disaster areas, and the like. Therefore, a flying robot may land on an uneven ground or walk on an uneven ground. When a flying robot lands on an uneven ground or walks on an uneven ground, it is necessary to detect whether the legs of the flying robot are landing (touching) or what shape of the ground the legs are landing (touching), etc., in order to keep the flying robot in an appropriate posture.

In order to meet the above-mentioned requirements, there may be considered a method of mounting a force sensor capable of detecting loads in multiaxial directions onto the tip end of each leg of the flying robot. However, the force sensor as described above requires a structure such as a strain body, and thus tends to be large in size and weight. Therefore, depending on the size of each leg of the flying robot, it may be difficult to mount the force sensor. Furthermore, the weight of the force sensor may affect the flight performance of the flying robot.

In addition, when the flying robot lands, relatively large impacts may be applied to the tips of the legs. On the other hand, there may be considered a method of covering the sensor with a cover made of a flexible material so as to protect it from impacts upon landing, etc., of the flying robot, but if the sensor is covered with such a cover, the detection accuracy of the sensor may be reduced.

The present invention has been made in view of the above circumstances, and an object of the present invention is to provide a contact sensor module that can achieve both protection of a sensor and detection accuracy while ensuring the degree of freedom of mounting on a flying robot or the like.

Solution to Problem

One aspect of the present invention is a contact sensor module including:

a base unit with columnar shape;

a plurality of pressure-sensitive sensors in a thin film shape mounted on a surface of the base unit at a tip end thereof in a state inclined so as to approach a central axis of the base unit along a first direction from a base end side toward a tip end side of the base unit;

a cover having flexibility and attached to the base unit so as to cover the tip end of the base unit; and a hollow intermediate member formed to be harder than the cover and disposed between the tip end of the base unit and the cover;

wherein the intermediate member is formed such that an outer wall surface of the intermediate member is in close contact with an inner wall surface of the cover, and an inner wall surface of the intermediate member is in contact with the plurality of pressure-sensitive sensors, with a gap formed between the intermediate member and the surface of the base unit.

Here, note that the present invention can also be considered as a flying robot in which the above-mentioned contact sensor module is mounted on a tip end of a leg.

Advantageous Effects of Invention

According to the present invention, it is possible to provide a contact sensor module that can achieve both protection of a sensor and detection accuracy while ensuring the degree of freedom of mounting on a flying robot or the like.

BRIEF DESCRIPTION OF THE DRAWINGS

FIG. 1 is a view illustrating an example of a flying robot to which a contact sensor module according to a first embodiment is applied.

FIG. 2 is a view illustrating a schematic configuration of the contact sensor module according to the first embodiment.

FIG. 3 is a plan view of a base unit according to the first embodiment as viewed from a tip end side thereof.

FIG. 4 is an axial cross-sectional view of the base unit in the first embodiment.

FIG. 5 is a perspective view illustrating the configuration of an inner wall surface of an intermediate member in the first embodiment.

FIG. 6 is a plan view of a cover in the first embodiment, as viewed in a first direction.

FIG. 7 is an axial cross-sectional view of the cover in the first embodiment.

FIG. 8 is an axial cross-sectional view of the contact sensor module in a state where the cover and the intermediate member are attached to the base unit in the first embodiment.

FIG. 9 is a perspective view of a base unit in a second embodiment.

FIG. 10 is a plan view of the base unit in the second embodiment, as viewed from a tip end side thereof.

FIG. 11 is an axial cross-sectional view of the base unit in the second embodiment.

FIG. 12 is an axial cross-sectional view of a cover in the second embodiment.

FIG. 13 is a perspective view illustrating the configuration of a hollow portion of the cover in the second embodiment.

FIG. 14 is an axial cross-sectional view of a contact sensor module in a state where the cover is attached to the base unit in the second embodiment.

FIG. 15 is a side view of a base unit in a modification of the second embodiment.

FIG. 16 is a plan view of the base unit in the modification of the second embodiment, as viewed from a tip end side thereof.

FIG. 17 is a plan view of a cover in the modification of the second embodiment, as viewed from a base end side.

FIG. 18 is a side view of a contact sensor module in a state where the cover is attached to the base unit in the modification of the second embodiment.

EMBODIMENTS FOR CARRYING OUT THE INVENTION

In a contact sensor module, which is one aspect of the present invention, a tip end of a base unit and an intermediate member are covered with a cover having flexibility. Thus, when the contact sensor module contacts an object, the cover comes into contact with the object to be deformed and/or deflected, whereby a contact load acting on the tip end of the base unit and the intermediate member can be dispersed and/or attenuated. As a result, it is possible to suppress an excessive contact load from acting on a pressure-sensitive sensor mounted on the tip end of the base unit. For example, in cases where the contact sensor module of the present invention is mounted on a tip end of a leg of a flying robot, it is possible to protect the pressure-sensitive sensor from impacts upon landing or the like of the flying robot.

On the other hand, an inner wall surface of the cover and an outer wall surface of the intermediate member are in close contact with each other, so that the contact load with the object can be transmitted from the cover to the intermediate member being while dispersed and/or attenuated by the cover. The intermediate member according to the present invention is formed to be harder than the cover. Further, the inner wall surface of the intermediate member is in contact with a plurality of pressure-sensitive sensors, but a gap is formed between the inner wall surface of the intermediate member and the surface of the base unit. Thus, the contact load dispersed and/or attenuated by the cover can be efficiently transmitted to the pressure-sensitive sensors via the intermediate member. As a result, the contact between the contact sensor module and the object can be detected more reliably by the pressure-sensitive sensors. For example, in cases where the contact sensor module of the present invention is mounted on the tip end of each leg of the flying robot, it is possible to accurately detect the landing (touching) of the legs when the flying robot lands or walks.

Therefore, according to the contact sensor module of the present invention, it is possible to protect the pressure-sensitive sensors while ensuring the detection accuracy of the pressure-sensitive sensors.

In addition, the pressure-sensitive sensors according to the present invention are mounted on the surface of the base unit in a state inclined so as to approach a central axis of the base unit along a first direction from the base end side toward the tip end side of the base unit. Thus, not only a load acting in an axial direction of the base unit but also a load acting in a direction perpendicular to the axial direction of the base unit can be detected by the pressure-sensitive sensors. For example, in the case where the contact sensor module of the present invention is mounted on the tip end of each leg of the flying robot, even if a landing surface (touching surface) for the legs of the flying robot is an inclined surface or the like, it is possible to accurately detect the landing (ground touching) of the legs.

Moreover, the contact sensor module according to the present invention includes a plurality of pressure-sensitive sensors mounted as described above. This makes it possible to more reliably detect the contact load dispersed by the cover. Further, it is also possible to detect the load acting in the direction perpendicular to the axial direction of the base unit by classifying or dividing the load into two or more axial directions. For example, in cases where the contact sensor module of the present invention is mounted on the tip end of each leg of the flying robot, it is also possible to detect what shape of the ground the legs of the flying robot are landing (touching) on.

Further, by using pressure-sensitive sensors each in a thin film shape, the contact sensor module according to the present invention can be made smaller and lighter than a contact sensor module using force sensors that require a structure such as a strain body. This can increase the degree of freedom of a device or equipment on which the contact sensor module can be mounted. For example, it becomes possible to mount the contact sensor module according to the present invention on a device or equipment such as a flying robot that requires a reduction in size and weight of sensors. Furthermore, the pressure-sensitive sensors are less expensive than the force sensors, it is possible to manufacture the contact sensor module at a lower cost.

Hereinafter, embodiments to put the present invention into practice will be described with reference to the drawings. However, the dimensions, materials, shapes, relative arrangements and so on of component parts described in the embodiments are not intended to limit the scope of the present invention to these alone in particular as long as there are no specific statements. In addition, the following embodiments can be combined with one another as long as such combinations are possible and appropriate.

Embodiment 1

In the present embodiment, a contact sensor module 1 to be applied to a flying robot 100 will be described as an example. FIG. 1 is a view illustrating an example of the flying robot 100 to which the contact sensor module 1 according to the embodiment is applied.

The flying robot 100 includes a body 110 including a plurality of propulsion modules and a plurality of legs 120 supporting the body 110. The propulsion modules are each configured to include, for example, a propeller, an actuator that rotationally drives the propeller, and so on. The flying robot 100 is configured to be able to adjust the flying attitude, the flying speed, and the like thereof by individually controlling the plurality of propulsion modules. When landing such a flying robot 100 from a flying state, a sensing mechanism is required to detect whether each leg 120 is in contact (touch) with the landing surface. Further, such a sensing mechanism is required to be small and lightweight. Therefore, in the present embodiment, a contact sensor module 1 to be described below is mounted on the tip end of each leg 120 of the flying robot 100.

(Contact Sensor Module)

The contact sensor module 1 of the present embodiment will be described with reference to FIGS. 2 through 8. FIG. 2 is a view illustrating component parts of the contact sensor module 1 in the present embodiment. FIG. 3 is a plan view of a base unit 2 in the present embodiment as viewed from a tip end side thereof. FIG. 4 is an axial cross-sectional view of the base unit 2 in the present embodiment. FIG. 5 is a perspective view showing the configuration of an inner wall surface of an intermediate member 3 in the present embodiment. FIG. 6 is a plan view of a cover 4 in the present embodiment. FIG. 7 is an axial cross-sectional view of the cover 4 in the present embodiment. FIG. 8 is an axial cross-sectional view of the contact sensor module 1 in a state where the intermediate member 3 and the cover 4 are attached to the base unit 2.

The contact sensor module 1 in the present embodiment is configured to include the base unit 2, the intermediate member 3, and the cover 4, as illustrated in FIG. 2. Hereinafter, the configurations of the base unit 2, the intermediate member 3, and the cover 4 will be described.

(Base Unit 2)

The base unit 2 is a member mounted on the tip end 21 of each leg 120 of the flying robot 100 and is formed in a regular square column shape. The base unit 2 is mounted on the tip end of each leg 120 so that the longitudinal direction (axial direction) of the base unit 2 coincides with the axial direction of the leg 120.

Here, note that, of both ends in the axial direction of the base unit 2, one end (an upper end portion in FIG. 2) mounted on the tip end of the leg 120 is hereinafter referred to as a base end, and the other end (a lower end portion in FIG. 2) on the opposite side of the base end is referred to as a tip end. In addition, a direction from the base end side to the tip end side in the axial direction of the base unit 2 is referred to as a "first direction".

The tip end 21 of the base unit 2 is formed in a square pyramid shape, as illustrated in FIGS. 2 and 3. A keyhole-shaped recess 210 is formed in each of four side faces at the tip end 21 of the base unit 2. A pressure-sensitive sensor 5 is attached to a bottom surface of each recess 210. Each pressure-sensitive sensor 5 is a pressure-sensitive resistance type sensor formed in a circular shape, and is attached to the bottom surface of a circular portion of each keyhole-shaped recess 210.

In the embodiment, as illustrated in FIG. 4, the tip end 21 of the base unit 2 and each recess 210 are formed such that an angle (a in FIG. 4) formed by a central axis (L2 in FIG. 4) of each pressure-sensitive sensor 5 and a central axis (L1 in FIG. 4) of the base unit 2 is 45 degrees. That is, the dimensions and shapes of the tip end 21 of the base unit 2 and each recess 210 in the present embodiment are determined such that an inclination angle of each pressure-sensitive sensor 5 with respect to the central axis L1 of the base unit 2 is 45 degrees.

In addition, a first protrusion 220 extending in a direction perpendicular to the axial direction of the base unit 2 is formed on a side face (a side face of a regular square column shaped portion) at the base end side of the base unit 2 rather than the tip end 21.

The shape of the base unit 2 other than the tip end 21 is not limited to a regular square column shape, and can be appropriately changed according to the shape of each leg 120 of the flying robot 100.

(Intermediate Member 3)

The intermediate member 3 is a member installed on the tip end 21 of the base unit 2. The intermediate member 3 in the present embodiment is formed in a hollow regular square pyramid shape having the same number of side faces as the tip end 21 of the base unit 2 and having a bottom surface opened. The shape of the inner wall surface of the intermediate member 3 is formed to be substantially the same as the tip end 21 of the base unit 2. The intermediate member 3 is formed such that its dimensions in plan view is equal to or less than the tip end 21 of the base unit 2.

The inner wall surface of the intermediate member 3 in the present embodiment is provided with four cylindrical-shaped protrusions 30, as illustrated in FIG. 5. The four protrusions 30 are provided at locations facing the four pressure-sensitive sensors 5, respectively, in a state where the intermediate member 3 is installed on the tip end 21 of the base unit 2. Each projection 30 is formed such that the diameter of the projection 30 is equal to or larger than the diameter of each pressure-sensitive sensor 5 and smaller than the diameter of the circular portion of each recess 210. As illustrated in FIG. 8, the height of each protrusion 30 is determined such that a gap (G1 in FIG. 8) is formed between the portion of the inner wall surface of the intermediate member 3 other than the protrusions 30 and the portion of the tip end 21 of the base unit 2 other than the recesses 210 in a state where the intermediate member 3 is installed on the tip end 21 of the base unit 2 (the four protrusions 30 are in contact with the four pressure-sensitive sensors 5, respectively).

The intermediate member 3 configured as described above is formed to be harder than the cover 4 to be described later. For example, the intermediate member 3 may be formed of a material such as an epoxy-based hard resin.

(Cover 4)

The cover 4 is a member that is attached to the base unit 2 so as to cover the intermediate member 3 and the tip end 21 of the base unit 2. The cover 4 in the present embodiment is formed in a hollow spherical segment shape having an opening of a regular square shape in plan view, as illustrated in FIG. 6. The hollow portion of the cover 4 is formed by four side walls 40 having a regular square column shape and a bottom surface 41 having a regular square pyramid shape, as illustrated in FIGS. 6 and 7. The dimensions of the hollow portion in plan view are substantially the same as the dimensions of the base unit 2 in plan view. That is, the dimensions of the hollow portion are determined such that the four side walls 40 are in close contact with the portion of the base unit 2 that forms a regular square column shape in a state where the cover 4 is attached to the base unit 2. The dimensions of the bottom surface 41 of the hollow portion are substantially equal to the dimensions of the outer side wall surface of the intermediate member 3. That is, the dimensions of the bottom surface 41 are determined such that the bottom surface 41 is in close contact with the outer wall surface of the intermediate member 3 in a state where the cover 4 is attached to the base unit 2.

The four side walls 40 in the hollow portion of the cover 4 are provided with second protrusions 400 extending in a direction perpendicular to the longitudinal direction of the hollow portion, respectively, as illustrated in FIG. 7. The second protrusions 400 are each formed to have a square shape in plan view. The positions of the second protrusions 400 are determined such that the second protrusions 400 are located closer to the base end side of the base unit 2 than the first protrusions 220 in a state where the cover 4 is attached to the base unit 2, and a surface of each first protrusion 220 at the base end side of the base unit 2 and a surface of each second protrusion 400 at the tip end side of the base unit 2 are in abutment with each other, as illustrated in FIG. 8. This can suppress the positional shift of the cover 4 in the first direction and the slipping-out of the cover 4 from the base unit 2.

The cover 4 configured as described above is formed to be more flexible than the intermediate member 3 described above. For example, the cover 4 may be formed of a material having flexibility, such as a polyurethane-based elastic resin.

Operation and Effects of Embodiment 1

Here, the operation and effects of the present embodiment will be described. When the flying robot 100 illustrated in FIG. 1 lands from a flying state, the contact sensor module 1 mounted on the tip end of each leg 120 comes into contact with the landing surface. In that case, the cover 4 of the contact sensor module 1 contacts the landing surface. Since the cover 4 in the present embodiment has flexibility, the cover 4 is deformed or deflected when it comes into contact with the landing surface, so that the contact load with the landing surface is dispersed and/or attenuated by the cover 4. Thereby, the contact load acting on the tip end 21 of the base unit 2 and the intermediate member 3 can be dispersed and/or attenuated. As a result, it is possible to suppress an excessive contact load from acting on the pressure-sensitive sensors 5 mounted on the tip end 21 of the base unit 2. That is, it is possible to protect the pressure-sensitive sensors 5 from impacts or the like generated upon landing of the flying robot 10.

On the other hand, in the contact sensor module 1 in the present embodiment, the bottom surface 41 of the hollow portion of the cover 4 and the outer side wall surface of the intermediate member 3 are in close contact with each other, so that the contact load dispersed and/or attenuated by the cover 4 is transmitted from the cover 4 to the intermediate member 3 in a more reliable manner. Here, the intermediate member 3 in the present embodiment is formed to be harder than the cover 4. Further, of the inner wall surface of the intermediate member 3, the portions of the protrusions 30 are in contact with the pressure sensors 5, but the portions other than the protrusions 30 are not in contact with the tip end 21 of the base unit 2. Therefore, the contact load transmitted from the cover 4 to the intermediate member 3 is efficiently transmitted from the intermediate member 3 to the pressure-sensitive sensors 5. As a result, the contact between the contact sensor module and the landing surface can be detected by the pressure-sensitive sensors 5 with high detection accuracy. In addition, in cases where the flying robot 100 is configured to be able to walk, it is also possible to accurately detect whether the legs 120 are in contact with the ground.

Therefore, according to the contact sensor module 1 in the present embodiment, it is possible to detect landing (ground touching) of each leg 120 at the time of landing or walking of the flying robot 100 with high accuracy, while protecting the pressure-sensitive sensors 5. That is, even in cases where the contact sensor module 1 is mounted on each leg 120 of the flying robot 100, the pressure-sensitive sensors 5 can be protected, while ensuring the detection accuracy of the pressure-sensitive sensors 5.

In addition, in the contact sensor module 1 in the present embodiment, the pressure-sensitive sensors 5 are mounted on the tip end 21 of the base unit 2 in an inclined state so as to approach the center axis of the base unit 2 along the first direction from the base end side toward the tip end side of the base unit 2. Thus, not only a load acting in the axial direction of the base unit 2 but also a load acting in the direction perpendicular to the axial direction of the base unit 2 can be detected by the pressure-sensitive sensors 5. In particular, in the contact sensor module 1 of the present embodiment, since the pressure-sensitive sensors 5 are mounted on the tip end 21 of the base unit 2 such that the inclination angle of each pressure-sensitive sensor 5 with respect to the central axis of the base unit 2 is 45 degrees, it is possible to more accurately detect the load acting in the axial direction of the base unit 2 and the load acting in the direction perpendicular to the axial direction of the base unit 2. Thus, even when the legs 120 of the flying robot 100 land (touch) on an inclined surface or the like, it is possible to accurately detect the landing (ground touching) of the legs 120.

Moreover, in the contact sensor module 1 in the present embodiment, the pressure-sensitive sensors 5 are mounted on the four side faces, respectively, at the tip end 21 of the base unit 2. This makes it possible to more reliably detect the contact load dispersed by the cover 4. Further, it is also possible to detect the load acting in the direction perpendicular to the axial direction of the base unit 2 by classifying the load into two or more axial directions. For example, when the flying robot 100 lands on an uneven ground and/or when the flying robot 100 walks on an uneven ground, it is also possible to detect what shape of the ground the legs 120 of the flying robot 100 are landing (touching) on.

Further, the contact sensor module 1 in the present embodiment can be reduced in size and in weight by using the pressure-sensitive sensors 5 of the pressure-sensitive resistance type each having a thin film shape, as compared with a case where force sensors each using a structure such as a strain body is used. This can increase the degree of freedom of a device or equipment on which the contact sensor module 1 can be mounted. As a result, the contact sensor module 1 of the present embodiment can be suitably mounted on a device or equipment such as the flying robot 100 that requires downsizing and weight reduction of the sensor module. That is, the influence of the size and weight of the contact sensor module 1 on the flight performance and the like of the flying robot 100 can be minimized. Furthermore, since the pressure-sensitive sensors 5 of the pressure-sensitive resistance type are inexpensive compared to force sensors or the like, the contact sensor module 1 can be manufactured at a lower cost.

Here, note that in the present embodiment, the contact sensor module 1 including four pressure-sensitive sensors 5 is mentioned as an example, but the number of pressure-sensitive sensors 5 is not limited to four and may be any number as long as it is plural. However, in cases where it is necessary to detect the load acting in the direction perpendicular to the axial direction of the base unit 2 by classifying it into two or more axial directions, it is desirable to mount three or more pressure-sensitive sensors 5 on the tip end 21 of the base unit 2. In addition, in cases where three pressure-sensitive sensors 5 are mounted on the tip end 21 of the base unit 2, the shape of the tip end 21 of the base unit 2 may be formed in an equilateral triangular pyramid shape. Also, in cases where five or more pressure-sensitive sensors 5 are mounted on the tip end 21 of the base unit 2, the shape of the tip end 21 of the base unit 2 may be formed in a regular polygonal pyramid shape with five or more side faces such as a regular pentagonal or more polygonal pyramid.

Embodiment 2

Next, a second embodiment of a contact sensor module 1 according to the present invention will be described with reference to FIGS. 9 through 14. FIG. 9 is a perspective view of a base unit 22 in the present embodiment. FIG. 10 is a plan view of the base unit 22 in the present embodiment as viewed from its tip end side. FIG. 11 is an axial cross-sectional view of the base unit 22 in the present embodiment. FIG. 12 is an axial cross-sectional view of a cover 42 in the present embodiment. FIG. 13 is a perspective view illustrating the configuration of a hollow portion of the cover 42 in the present embodiment. FIG. 14 is an axial cross-sectional view of the contact sensor module 1 in a state where the cover 42 is attached to the base unit 22.

Here, note that in the present embodiment, the configurations different from those of the first embodiment described above will be described, but the description of the same configurations will be omitted.

A tip end 24 of the base unit 22 in the present embodiment is formed in a hemispherical shape, as illustrated in FIGS. 9 through 11. Note that a base end side portion of the base unit 22 (hereinafter referred to as a "column portion 23") is formed into a regular square shape, as in the above-described embodiment. As illustrated in FIGS. 9 and 10, four cylindrical recesses 240 are provided at equal intervals in the circumferential direction in the tip end 24 formed in the hemispherical shape. A pressure-sensitive sensor 5 is attached or stuck to the bottom surface of each recess 240.

In the present embodiment, as illustrated in FIG. 11, the tip end 24 of the base unit 22 and the recesses 240 are formed such that an angle (B in FIG. 11) formed by a central axis (L4 in FIG. 11) of each pressure-sensitive sensor 5 and a central axis (L3 in FIG. 11) of the base unit 22 is 45 degrees. That is, the dimensions and shapes of the tip end 24 of the base unit 22 and the recesses 240 in the present embodiment are determined such that an inclination angle of each pressure-sensitive sensor 5 with respect to the central axis L3 of the base unit 22 is 45 degrees.

In addition, as illustrated in FIGS. 9 and 11, a locking portion 25 and a pedestal portion 26, which are connected to each other via a step, are provided between the column portion 23 and the tip end 24. The locking portion 25 is arranged closer to the tip end side of the base unit 22 than the pedestal portion 26. The locking portion 25 is formed in an annular shape that increases in diameter along the first direction. The locking portion 25 is formed such that the maximum diameter of the locking portion 25 is larger than the maximum diameter of the tip end 24. The pedestal portion 26 is formed in an annular shape that increases in diameter along the first direction, similarly to the locking portion 25. The pedestal portion 26 is formed such that the maximum diameter of the pedestal portion 26 is larger than the maximum diameter of the locking portion 25.

Next, the cover 42 in the present embodiment is formed in a hollow spherical segment shape having a circular opening, as illustrated in FIGS. 12 and 13. The cover 42 is formed such that a proportion occupied by the cover 42 in the sphere is larger than that of the hemisphere. That is, the cover 42 of the present embodiment is formed such that the outer diameter of the opening portion is smaller than the maximum diameter of the cover 42. In addition, the hollow portion of the cover 42 is formed in a spherical segment shape. At that time, the hollow portion of the cover 4 is formed such that the curvature of the inner wall surface surrounding the hollow portion is substantially equal to the curvature of the locking portion 25 on the base unit 22, and the inner diameter of the opening portion is smaller than the maximum diameter of the locking portion 25 in the base unit 22. This is because, as illustrated in FIG. 14, in a state where the cover 42 is attached to the base unit 22, a portion of the inner wall surface of the cover 42 located at the base end side of the base unit 22 is brought into surface contact with the outer peripheral surface of the locking portion 25. This can suppress the positional shift of the cover 42 in the first direction, the detachment of the cover 42 from the base unit 22, and the positional shift of the cover 42 in the circumferential direction. In particular, when the flying robot 100 lands on an uneven ground or when the flying robot 100 walks on an uneven ground, loads in various directions may act on the cover 42, but it is possible to suppress the positional shift and detachment of the cover 42 when such loads acts.

In addition, an intermediate member 31 is provided in the hollow portion of the cover 42 in the present embodiment. The intermediate member 31 in the present embodiment is formed in a hollow hemispherical shape, as illustrated in FIG. 12. Then, the inner wall surface of the intermediate member 31 is provided with four cylindrical protrusions 32. The four protrusions 32 are provided at locations facing the four pressure-sensitive sensors 5 in a state where the cover 42 is attached to the base unit 22. Each projection 32 is formed such that the diameter of the projection 32 is equal to or larger than the diameter of each pressure-sensitive sensor 5 and smaller than the diameter of each recess 240. Further, as illustrated in FIG. 14, the height of each protrusion 32 is determined such that a gap (G2 in FIG. 14) is formed between the portion of the inner wall surface of the intermediate member 31 other than the protrusions 32 and the portion of the tip end 24 of the base unit 22 other than the recesses 240 in a state where the cover 42 is attached to the base unit 22. Note that in the example illustrated in FIGS. 12 through 14, the inner wall surface of the intermediate member 31 is formed in a spherical segment shape, but is not limited to this. That is, the cover 42 may be in any shape other than a spherical segment shape as long as it is shaped such that a gap is formed between the portion of the inner wall surface of the intermediate member 31 other than the protrusions 32 and the portion of the tip end 24 of the base unit 22 other than the recesses 240 in a state where the cover 42 is attached to the base unit 22. The intermediate member 31 configured in this way is integrally formed or molded with the cover 42.

Here, note that the shape and dimensions of the intermediate member 31 in the present embodiment are determined such that gap (G3 in FIG. 14) is formed between a portion of the intermediate member 31 facing the locking portion 25 of the base unit 22 and the locking portion 25 in a state where the cover 42 is attached to the base unit 22, as illustrated in FIG. 14. Thus, it is possible to suppress a part of the contact load transmitted from the cover 42 to the intermediate member 31 from being transmitted to the base unit 22 without being transmitted from the intermediate member 31 to the pressure sensors 5. As a result, it is also possible to detect the landing (ground touching) of the legs 120 with high detection accuracy when the flying robot 100 lands or walks.

In addition, the shape and dimensions of the cover 42 may be determined such that a gap (G4 in FIG. 14) is formed between a portion of the cover 42 facing the pedestal portion 26 of the base unit 22 and the pedestal portion 26 in a state where the cover 42 is attached to the base unit 22, as illustrated in FIG. 14. Thus, it is possible to suppress a part of the contact load dispersed by the cover 42 from being transmitted to the base unit 22 without being transmitted to the intermediate member 31 or the pressure-sensitive sensors 5. As a result, it is also possible to detect the landing (ground touching) of the legs 120 with high detection accuracy when the flying robot 100 lands or walks.

According to the above-described embodiment, the same effects as those of the first embodiment described above can be obtained. Further, the intermediate member 31 in this present embodiment can be formed so as not to have corners except for the protrusions 32, thus making it possible to improve its durability. In particular, it is possible to suppress the impact generated upon landing of the flying robot 100 from being concentrated on a part of the intermediate member 3. In addition, by integrally forming the intermediate member 31 and the cover 42 with each other, it is possible to suppress a positional shift between the cover 42 and the intermediate member 31 when the flying robot 100 lands or walks.

Modification of Embodiment 2

As described in the above-mentioned second embodiment, in cases where the tip end 24 of the base unit 22 is formed in a hemispherical shape, a plurality of fitting protrusions 260 may be provided on the outer peripheral surface of the locking 25, as portion illustrated in FIGS. 15 and 16. The fitting protrusions 260 are each a protrusion extending from the pedestal portion 26 to the middle of the locking portion 25 along the first direction. Note that in the example illustrated in FIGS. 15 and 16, the plurality of fitting protrusions 260 are provided at equal intervals in the circumferential direction on the outer peripheral surface of the locking portion 25, but one fitting protrusion 260 may instead be provided. In addition, in the example illustrated in FIGS. 15 and 16, the fitting protrusions 260 are formed so as to be continuous with the pedestal portion 26, but the fitting protrusions 260 may be formed so as to be separated from the pedestal portion 26.

When the above-mentioned fitting protrusions 260 are provided on the locking portion 25, as illustrated in FIG. 17, notches 420 may be provided in those portions of the opening of the cover 42 which correspond to the above-mentioned fitting protrusions 260. The shape and size of each notch 420 are determined such that a gap (G5 in FIG. 18) is formed between the bottom of each notch 420 and the tip end of each fitting protrusion 260 in a state where the cover 42 is attached to the base unit 22, as illustrated in FIG. 18. Thus, it is possible to suppress a part of the contact load dispersed by the cover 42 from being transmitted to the base unit 22 without being transmitted to the intermediate member 31 or the pressure-sensitive sensors 5.

According to the present modification, it is possible to obtain the same effects as those of the above-described second embodiment, and it is possible to more reliably suppress a positional shift of the cover 42 in the circumferential direction with respect to the base unit 22 when the flying robot 100 lands or walks. As a result, it is possible to more reliably suppress a decrease in detection accuracy due to a positional shift between the protrusions 32 of the intermediate member 31 and the pressure-sensitive sensors 5. For example, it is possible to more reliably suppress a decrease in detection accuracy when landing (ground touching) of the legs 120 is detected, at the time of landing or walking of the flying robot 100.

Others

In the embodiments and the modification described above, examples have been described in which the contact sensor module 1 is applied to the flying robot 100, but the contact sensor module 1 is not limited to this, and can be applied to other than the flying robot 100. For example, the contact sensor module 1 can be mounted on a tip end of each leg of a walking robot.

REFERENCE SIGNS LIST

1 . . . contact sensor module, 2 (22) . . . base unit, 3 (31) . . . intermediate member, 4 (42) . . . cover, 5 . . . pressure-sensitive sensors, 21 (24) . . . tip end, 25 . . . locking portion, 26 . . . pedestal portion, 30 (32) . . . protrusions, 100 . . . flying robot, 210 (240) . . . recesses, 220 . . . first protrusions, 260 . . . locking protrusions, 400 . . . second protrusions, 420 . . . recesses

The invention claimed is:

1. A contact sensor module comprising:

a base unit with columnar shape;

a plurality of pressure-sensitive sensors in a thin film shape mounted on a surface of the base unit at a tip end of the base unit in a state inclined so as to approach a central axis of the base unit along a first direction from a base end side toward a tip end side of the base unit;

a cover having flexibility and attached to the base unit so as to cover the tip end of the base unit; and a hollow intermediate member formed to be harder than the cover and disposed between the tip end of the base unit and the cover;

wherein the intermediate member is formed such that an outer wall surface of the intermediate member is in close contact with an inner wall surface of the cover, and an inner wall surface of the intermediate member is in contact with the plurality of pressure-sensitive sensors, and portions of the inner wall surface of the intermediate member other than the portions in contact with the plurality of pressure-sensitive sensors are formed so as not to contact the surface of the base unit with a gap formed between the intermediate member and the surface of the base unit.

2. The contact sensor module according to claim 1, wherein the plurality of pressure-sensitive sensors are mounted on the surface of the base unit such that an inclination angle thereof with respect to the central axis of the base unit is 45 degrees.

3. The contact sensor module according to claim 1, wherein the tip end of the base unit is formed in a regular polygonal pyramid shape;

the plurality of the pressure-sensitive sensors are disposed one on each side face of the tip end of the base unit;

the intermediate member is formed in a hollow regular polygonal pyramid shape having the same number of side faces as the tip end of the base unit; and a plurality of protrusions configured to abut the plurality of pressure-sensitive sensors are provided on the inner wall surface of the intermediate member at its locations facing the plurality of pressure-sensitive sensors.

4. The contact sensor module according to claim 1, wherein the tip end of the base unit is formed in a spherical segment shape;

the plurality of pressure-sensitive sensors are disposed at equal intervals in a circumferential direction at the tip end of the base unit;

the intermediate member is formed in a hollow spherical segment shape having an inner diameter larger than the tip end of the base unit; and a plurality of protrusions configured to abut the plurality of pressure-sensitive sensors are provided on the inner wall surface of the intermediate member at its locations facing the plurality of pressure-sensitive sensors.

5. The contact sensor module according to claim 4, wherein the cover is formed in a hollow spherical segment shape that occupies a larger proportion of its sphere than its hemisphere; and an annular locking portion having a diameter increasing along the first direction is provided on a portion of the base unit at its base end side rather than its tip end; and a portion of the inner wall surface of the cover located at the base end side of the base unit is formed so as to be in surface contact with the locking portion.

6. The contact sensor module according to claim 5, wherein a fitting protrusion extending in the first direction is provided at at least one portion of the locking portion; and a notch into which the fitting protrusion is fitted is provided in a portion of the cover facing the fitting protrusion.

7. The contact sensor module according to claim 4, wherein a gap is formed between an end face of the cover located at the base end side of the base unit and the base unit.

8. The contact sensor module according to claim 4, wherein the cover and the intermediate member are integrally formed with each other.

9. A flying robot with the contact sensor module according to claim 1 mounted on a tip of a leg.

* * * * *